US012786789B2

(12) United States Patent
Suzuki et al.

(10) Patent No.: US 12,786,789 B2
(45) Date of Patent: Nov. 3, 2026

(54) MTU APPLICATION CONTROL IN CORE NETWORK NODE

(71) Applicant: RAKUTEN MOBILE, INC., Tokyo (JP)

(72) Inventors: Naoaki Suzuki, Tokyo (JP); Ryo Watanabe, Tokyo (JP); Hiroshi Shimura, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 490 days.

(21) Appl. No.: 18/002,049

(22) PCT Filed: Jul. 6, 2022

(86) PCT No.: PCT/JP2022/026810

§ 371 (c)(1),
(2) Date: Dec. 16, 2022

(87) PCT Pub. No.: WO2024/009423

PCT Pub. Date: Jan. 11, 2024

(65) Prior Publication Data

US 2024/0236763 A1 Jul. 11, 2024

(51) Int. Cl.

*H04W 28/06* (2009.01)
*H04L 47/36* (2022.01)
*H04W 92/12* (2009.01)

(52) U.S. Cl.

CPC ............. *H04W 28/06* (2013.01); *H04L 47/36* (2013.01); *H04W 92/12* (2013.01)

(58) Field of Classification Search

CPC ........ H04W 28/06; H04W 92/12; H04L 47/36
See application file for complete search history.

(56) References Cited

U.S. PATENT DOCUMENTS

| | | | | |
|---|---|---|---|---|
| 10,594,618 | B1 * | 3/2020 | Singh | H04L 47/283 |
| 10,608,947 | B2 * | 3/2020 | Lee | H04L 47/36 |
| 2006/0262732 | A1 * | 11/2006 | Joutsenvirta | H04W 28/18 370/254 |
| 2015/0146531 | A1 * | 5/2015 | Welin | H04L 47/36 370/235 |
| 2019/0313285 | A1 | 10/2019 | Gottwerth et al. | |
| 2020/0100085 | A1 * | 3/2020 | Buckley | H04W 4/90 |
| 2021/0051112 | A1 * | 2/2021 | Wondra | H04L 12/4633 |

(Continued)

OTHER PUBLICATIONS

J. McCann et al., "Path MTU Discovery for IP version 6", Internet Engineering Task Force (IETF), RFC8201, Jul. 2017, [online], [retrieved Jun. 21, 2022], Internet <https://datatracker.ietforg/doc/html/rfc8201>, 19pp.

*Primary Examiner* — Michael K Phillips
*Assistant Examiner* — Andrew S Kurian
(74) *Attorney, Agent, or Firm* — HAUPTMAN HAM, LLP

(57) ABSTRACT

A network management apparatus performs a determination process and an application process. The determination process is processing that determines an MTU (Maximum Transmission Unit) value based on information acquired from an incoming packet transmitted from a node constituting a wireless access network and received in a core network that aggregates a plurality of wireless access networks. The application process is processing that applies the MTU value to an outgoing packet to be transmitted from the core network to the node.

11 Claims, 11 Drawing Sheets

(56) References Cited

U.S. PATENT DOCUMENTS

| | | | | |
|---|---|---|---|---|
| 2023/0155950 | A1* | 5/2023 | Krishnaswamy | H04L 47/36<br>370/235 |
| 2024/0089788 | A1* | 3/2024 | Jiang | H04W 28/0268 |
| 2024/0284245 | A1* | 8/2024 | Guo | H04W 28/0236 |
| 2025/0141843 | A1* | 5/2025 | Liu | H04L 63/164 |
| 2025/0317402 | A1* | 10/2025 | Ihlar | H04W 48/18 |

* cited by examiner

FIG. 4

215

| PLMN | MTU |
|---|---|
| xxxxx (MNO) | 1500 |
| yyyyy (Enterprise#A) | 1450 |
| zzzzz (Enterprise#B) | 1400 |
| : | : |

MTU APPLICATION CONTROL IN CORE NETWORK NODE

RELATED APPLICATIONS

The present application is a National Phase of International Application Number PCT/JP2022/026810, filed Jul. 6, 2022.

TECHNICAL FIELD

The present disclosure relates to MTU application control in a core network node.

BACKGROUND ART

A mobile network is constituted with a Radio Access Network (RAN) and a Core Network (CN). RAN nodes are connected to a CN node (hereinafter also simply referred to as "core"), respectively, via a backhaul network.

For example, in case of a 5G mobile network, a RAN node corresponds to a Central Unit (CU) and the core corresponds to an Access and Mobility Management Function (AMF).

When the CN and the RAN constituting a mobile network are owned by a single Mobile Network Operator (MNO), the MNO is able to perceive a path Maximum Transmission Unit (MTU) between the core and the RAN nodes in advance, and set an MTU value to the core based on the above path MTU. This allows the core to transmit, to the RAN nodes, packets having the size as close as possible to the path MTU but not exceeding the path MTU, thereby improving transmission efficiency.

Here, the path MTU is set to the smallest value among MTUs of links from a transmission source to a transmission destination, and indicates the maximum size of a packet that can be forwarded from a source node to a destination node without fragmentation of the packet.

However, in recent years, in 5G networks that are operated individually by multiple operators, such as enterprises, municipal governments, respectively (hereinafter also referred to as "local G5"), sharing of MNO core functions has become prevailing. In this case, the core is able to be connected to each of CUs in a local 5G RAN. Since the core and the CUs in the local 5G RAN are connected by leased lines or a Virtual Private Network (VPN), the path MTUs therebetween may be different from one operator to another operator. For this reason, the core is required to dynamically detect the path MTU using the path MTU discovery technique to transmit packets.

As the conventional path MTU discovery technique, for example, "Path MTU Discovery for IPv6" has been known (see Non-Patent Literature 1 below)

LISTING OF REFERENCES

Non-Patent Literature

NON-PATENT LITERATURE 1: J. McCann et al, "Path MTU Discovery for IP version 6", Internet Engineering Task Force (IETF), RFC8201, July 2017, [online], [retrieved Jun. 21, 2022], Internet <https://datatracker.ietf.org/doc/html/rfc8201>

SUMMARY OF THE INVENTION

Problems to be Solved by the Invention

In the conventional path MTU discovery technique mentioned above, when a packet reaches a path that is unable to forward the packet due to a problem of MTU, the packet to be forwarded is discarded and an intermediate node (such as a router) that has failed to forward the packet sends an error message compliant with an Internet Control Message Protocol (ICMP) to the transmission source. The ICMP error message includes the MTU value of the intermediate node that caused the packet to be discarded. Upon receiving the ICMP error message, the transmission source needs to adjust the packet size to a value equal to or less than the MTU value included in the ICMP error message to retry to send the packet. When there are multiple intermediate nodes between the transmission source and the transmission destination, the above processes are iterated until the packet transmitted from the transmission source successfully reaches the transmission destination.

As mentioned above, the conventional path MTU discovery technique may incur transmission of ICMP error messages and re-transmission of packets, thus makes the packet transmission processing time consuming.

It may be considered possible to preset, as the MTU value of the core, the minimum value among respective path MTUs, which are determined through negotiations between the MNO and respective local 5G operators, without using the path MTU discovery technique mentioned above. In this case, the core would be able to transmit packets that do not exceed all of path MTUs to and from respective CUs. Therefore, it may eliminate transmission of ICMP error messages and re-transmission of packets mentioned above, thus it may accelerate the packet transmission processing to that extent. However, the minimum MTU value that does not exceed all of path MTUs would be necessarily applied for all messages to be transmitted to respective CUs.

When the MTU value is set to be smaller, more packets are required to deliver the same amount of data to the transmission destination. Since a header of a fixed size is added to each of packets, the data area in the packet to be transmitted becomes relatively small, resulting in lower transmission efficiency. Therefore, it is desirable to set the MTU value to be as large as possible without exceeding the path MTU.

Therefore, the present disclosure addresses problems to apply an appropriate MTU value in a core network node so as to further improve packet transmission efficiency.

Solution to Problems

In order to solve the above mentioned problems, according to one aspect of the present disclosure, there is provided a network management apparatus comprising one or more processors. At least one of the one or more processors performs a determination process and an application process. The determination process is processing that determines an MTU (Maximum Transmission Unit) value based on information acquired from an incoming packet transmitted from a node constituting a wireless access network and received in a core network that aggregates a plurality of wireless access networks. The application process is processing that applies the MTU value to an outgoing packet to be transmitted from the core network to the node.

In order to solve the above mentioned problems, according to another aspect of the present disclosure, there is provided a network management method, comprising: determining an MTU (Maximum Transmission Unit) value based on information acquired from an incoming packet transmitted from a node constituting a wireless access network and received in a core network that aggregates a plurality of wireless access networks: and applying the MTU value to an outgoing packet to be transmitted from the core network to the node.

In order to solve the above mentioned problems, according to yet another aspect of the present disclosure, there is provided a network management system comprising one or more processors. At least one of the one or more processors performs a determination process and an application process. The determination process is processing that determines an MTU (Maximum Transmission Unit) value based on information acquired from an incoming packet transmitted from a node constituting a wireless access network and received in a core network that aggregates a plurality of wireless access networks, The application process is processing that applies the MTU value to an outgoing packet to be transmitted from the core network to the node.

Advantageous Effect of the Invention

According to one aspect of the present disclosure, it makes it possible to apply an appropriate MTU value in a core network node so as to further improve packet transmission efficiency.

BRIEF DESCRIPTION OF DRAWINGS

FIG. 4 is a schematic diagram illustrating an exemplary structure of a mapping table.

DESCRIPTION OF EMBODIMENTS

Figure 1:
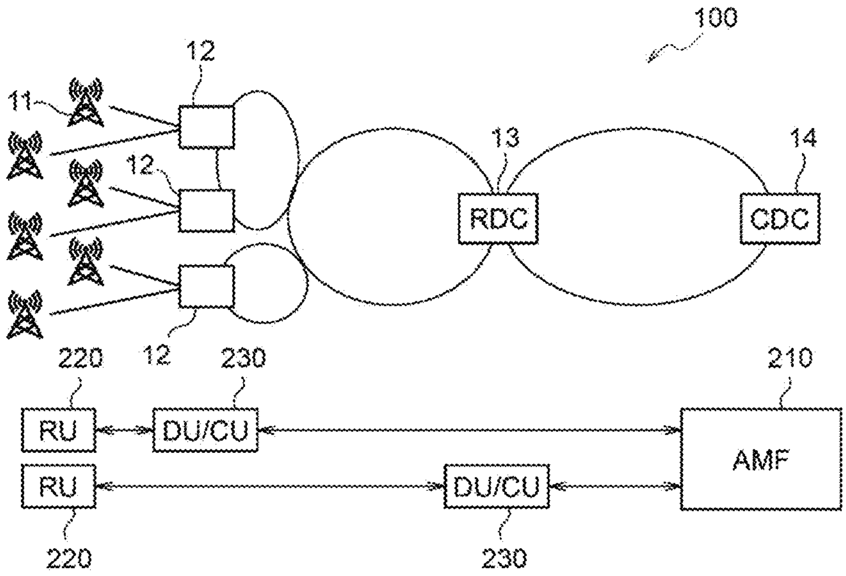
FIG. 1 is a conceptual diagram illustrating an exemplary network configuration of a mobile network including an MNO RAN.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

According to the present embodiment, it is assumed to use a $5^{th}$ generation (5G) mobile network, which is standardized by the Third Generation Partnership Project (3GPP) (registered trademark), as a network to which the technology according to the present disclosure is applied. However, it should be noted that the technology according to the present disclosure may be applied to networks other than the 5G mobile network.

Hereinafter, a non-limiting example will be described in which a network management apparatus according to the present embodiment has an MTU application control function that applies a Maximum Transmission Unit (MTU) value in a core network node in the 5G mobile network. In particular, according to the present embodiment, an exemplary case will be described in which the above core network node is an Access and Mobility Management Function (AMF), which is one of the network elements of the 5G core network.

FIG. 1 is a conceptual diagram illustrating an exemplary network configuration of a mobile network 100 to which a network management system according to the present embodiment is applicable.

The mobile network 100 shown in FIG. 1 includes Radio Access Networks (RANs), which a User Equipment (UE) directly access, and a Core Network (CN), which aggregates multiple RANs. In the mobile network 100, the UE and the RAN communicate with each other wirelessly and transmitted information is relayed to the CN for processing. This allows the UEs to connect to the Internet or to connect to another operator's network to make voice calls, or the like.

It should be noted that the UE may be a communication terminal capable of mobile communication such as a smartphone, tablet device, or personal computer (PC).

As shown in FIG. 1, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment may be a virtualized network constructed on a virtualization infrastructure. In this case, the mobile network 100 may realize everything from the switching equipment of the backbone network to the radio access functions of the base stations by software on general-purpose servers.

The base station 11 is equipped with an antenna, a switchboard, a battery, and the like. The base station 11 realizes functions of a Radio Unit (RU), which is a part of the RAN functions.

The edge data center 12 is located near the base stations 11 and is connected to a plurality of base stations 11 via fiber-optic cables, or the like.

The regional data center (RDC) 13 is connected to a plurality of edge data centers 12. The edge data center 12 or the regional data center 13 realizes functions of a Distributed Unit (DU) and a Central Unit (CU) 230, which are another part of RAN functions.

The central data center (CDC) 14 is connected to a plurality of edge data centers 12 and a plurality of regional data centers 13. The central data center 14 realizes functions of the 5G core network. CDC 14 realizes functions of the AMF, a Session Management Function (SMF), a User Plane Function (UPF) and the like, of the 5G core network.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

In the mobile network 100 shown in FIG. 1, a single Mobile Network Operator (MNO) performs the network management on an end-to-end basis.

In the mobile network 100 shown in FIG. 1, the CU 230, which is the RAN node of the MNO RAN, connects to the AMF 210, which is the core network node. It may be assumed that the communication protocol between the CU 230 and the AMF 210 is the NG Application Protocol (NGAP), which is standardized by 3GPP. In this case, sending and receiving NGAP messages allows the communication control between the CU 230 and the AMF 210, including connection establishment.

According to the present embodiment, in the mobile network 100, the functions of the core network to be managed by the MNO may be shared by multiple operators (i.e., local 5G operators) including enterprises, municipal governments, and the like. In other words, in the mobile network 100, multiple nodes of the multiple local 5G RANs, which are operated by multiple operators, respectively, may be connected to the CN node operated by the MNO.

Figure 2:
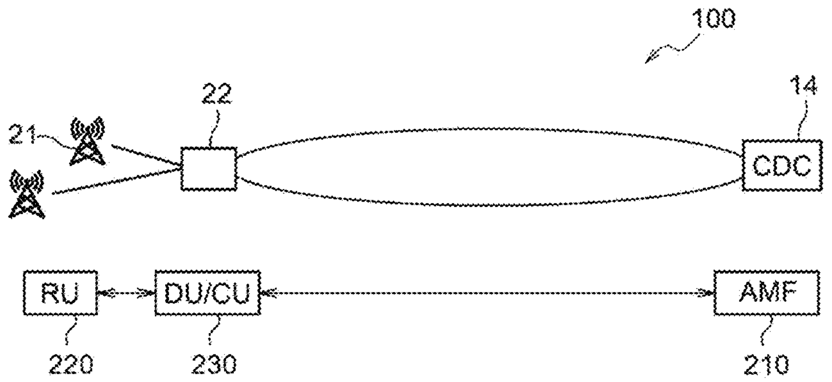
FIG. 2 is a conceptual diagram illustrating an exemplary network configuration of another mobile network including a local 5G RAN.

In other words, as shown in FIG. 2, the mobile network 100, to which the network management system according to the present embodiment is applicable, may be constituted with the central data center (CDC) 14, and base stations 21 and 22. The base stations 21 and 22 are 5G base stations (i.e., gNBs (gNodeBs)) that constitute a local 5G RAN for each of operators.

The base station 21 is equipped with an antenna, a switchboard, a battery, and the like. The base station 21 realizes functions of the Radio Unit (RU) 220, which is a part of the RAN functions.

The base station 22 is located near the base stations 11 and is connected to a plurality of base stations 21 via fiber-optic cables, or the like. The base station 22 realizes functions of the Distributed Unit (DU) and the Central Unit (CU) 230, which are another part of RAN functions.

A particular method of allocating the RUs, DUs and CUs is not limited to the above. For example, the RU and the DU may be deployed in the base station 21 and the CUs may be deployed in the base station 22. Alternatively, the RU, DU and CU may be deployed collectively in a single base station.

In the mobile network 100 shown in FIG. 1, a single MNO performs the network management on an end-to-end basis. The MNO is thus able to perceive in advance the path MTU between the AMF 210 and the CU 230 so that the MNO is able to preset the MTU value to the AMF 210 in advance.

For example, assuming that the path MTU between the AMF 210 and the CU 230 of the MNO RAN is 1500 bytes, the MNO may preset 1500 bytes to the AMF 210 as the MTU value for allowing the AMF 210 to communicate with the CU 230 concerned.

Here, the path MTU is the maximum packet size that allows a packet to be transmitted from a source node (e.g., AMF) to a destination node (e.g., CU) without fragmentation of the packet. The path MTU is also equal to the minimum value among the link MTUs in the path from the source node (e.g., AMF) to the destination node (e.g., CU).

Figure 9:
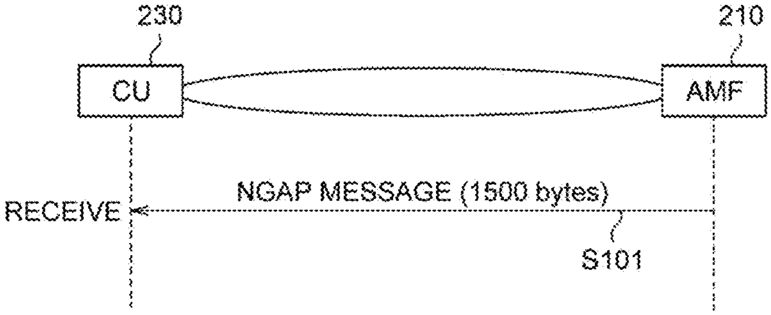
FIG. 9 is a sequence chart illustrating an exemplary operation for transmitting packets to the MNO RAN.

In this case, when the AMF 210 sends an NGAP message to the CU 230 of the MNO RAN, as shown in step S101 in FIG. 9, the AMF 210 is able to adjust the packet size to 1500 bytes or less to send the NGAP message. As a result, the CU 230 of the MNO RAN is able to receive the packet sent from the AMF 210 normally.

In addition, the AMF 210 is able to send messages with a size that is as close as possible to the path MTU and does not exceed the path MTU. For example, when an NGAP message with a packet size exceeding 1500 bytes needs to be sent, the AMF 210 splits an outgoing packet into packets each having a packet size that is as close as possible to 1500 bytes and does not exceed the path MTU to send the NGAP message. Therefore, it makes it possible to improve data transmission efficiency and enable effective use of network resources.

On the other hand, the AMF 210 is connected to each of the CU 230*s* of the local 5G RANs via a leased line or a Virtual Private Network (VPN), and the path MTU therebetween differs from one operator to another. For example, in some cases, the path MTU between the AMF 210 and the CU 230 of the local 5G RAN may be 1400 bytes, which is smaller than the path MTU (e.g., 1500 bytes) between the AMF 210 and the CU 230 of the MNO RAN (i.e., MNO backhaul network).

Figure 10:
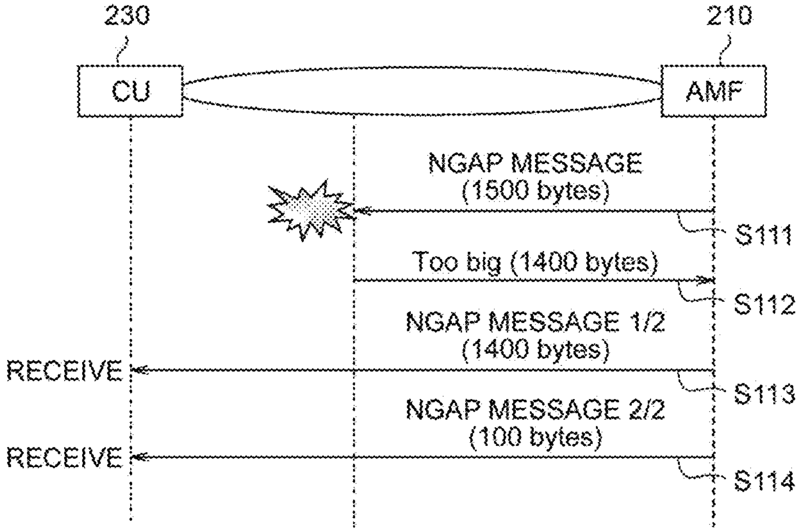
FIG. 10 is a sequence chart illustrating a conventional operation for transmitting packets to the local 5G RAN.

In this case, in the mobile network 100 shown in FIG. 2, even when the AMF 210 sends a message of 1500 bytes to the CU 230 of the local 5G RAN, as in the case of the CU 230 of the MNO RAN, the CU 230 concerned is unable to receive the message directly. FIG. 10 illustrates a packet transmission operation in this case.

First, in step S111, the AMF 210 sends an NGAP message with a packet size of 1500 bytes to the CU 230 of the local 5G RAN.

When the MTU value supported by an intermediate node such as a router located between the AMF 210 and the CU 230 of the local 5G RAN is 1400 bytes, then in step S112, the intermediate node sends a reply to the AMF 210 with an ICMP error message ("Too big") indicating that the packet size is too large. This ICMP error message includes information indicating the MTU value (i.e., 1400 bytes) supported by the intermediate node concerned.

Therefore, the AMF 210 splits a packet into multiple packets based on the MTU value included in the ICMP error message, and resends the split packets.

More specifically, referring to FIG. 10 in step S113, the AMF 210 sends an NGAP message with a packet size of 1400 bytes, and in step S114, the AMF 210 sends the remaining NGAP message with a packet size of 100 bytes.

Thus, the CU 230 of the local 5G RAN is able to receive the NGAP messages transmitted from the AMF 210 normally.

However, in this case, it makes the transmission processing time-consuming, as it incurs additional transmission of the ICMP error message and re-transmission of packets.

To cope with those circumstances, it may be considered to set, to the AMF, the minimum MTU value that does not exceed all of path MTUs to and from respective RAN nodes. In this case, the MNO would set, to the AMF 210, the minimum value among the path MTUs to and from the CUs of respective RANs. This ensures the AMF to transmit packets without exceeding all of the path MTUs to and from respective CUs so that no ICMP error messages are transmitted and no packets are retransmitted as mentioned above.

For this reason, it makes it possible for the packet transmission processing to be accelerated to that extent.

However, the minimum MTU value is inevitably applied to all messages to be transmitted to respective CUs, resulting in a decrease in packet transmission efficiency.

Figure 11:
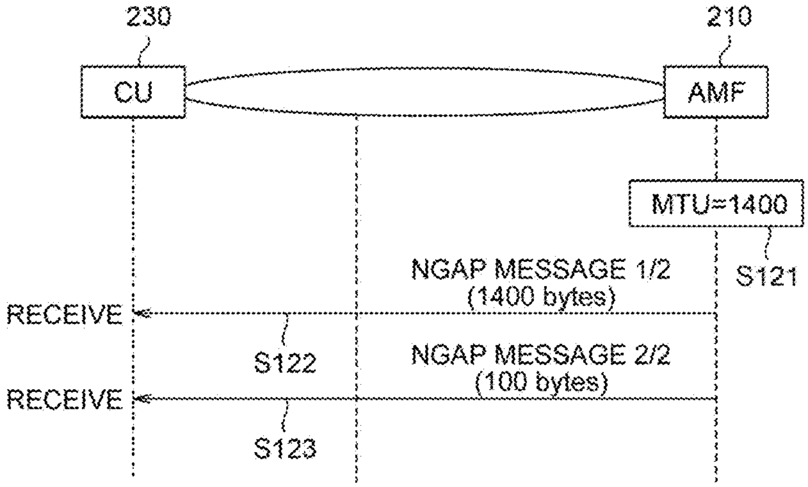
FIG. 11 is a sequence chart illustrating another conventional operation for transmitting packets to the local 5G RAN.

For example, when the AMF 210 may connect to both of the MNO RAN (path MTU=1500 bytes) and the local 5G RAN (path MTU=1400 bytes), the MTU value=1400 bytes is preset to the AMF 210 (in step S121 in FIG. 11).

Subsequently, even when the AMF 210 transmits an NGAP message of 1500 bytes, the preset MTU value=1400 bytes is applied to the AMF 210, thus the AMF 210 needs to split an outgoing packet into multiple packets to transmit the split packets (in step S122 and S123). In this case, the CU 230 is able to receive the NGAP messages sent from the AMF 210 normally.

However, in this case, the outgoing packet is required to be split to be sent in two separate transmissions, which could be originally sent in one transmission, to the CU 230 of the MNO RAN, resulting in a decrease in packet transmission efficiency.

In order to utilize network resources more efficiently, it is desirable to set an optimal MTU value to the core network node (i.e., AMF) for each of operators (i.e., RANs). It is also desirable to set the MTU values automatically without human intervention.

Therefore, according to the present embodiment, the core network node (i.e., AMF) has the MTU application control function that applies an optimal MTU value for each of operators (i.e., each of RANs).

More specifically, the AMF 210 receives an incoming packet transmitted from the RAN node, determines an MTU value based on information acquired from the incoming packet, and automatically applies the determined MTU value to outgoing packets to be transmitted to the above RAN node.

Figure 3:
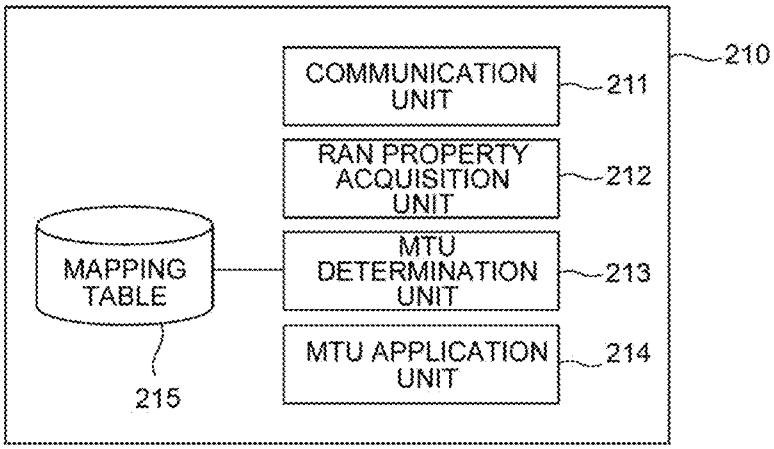
FIG. 3 is a block diagram illustrating an exemplary functional configuration of a core network node (i.e., AMF).

FIG. 3 is a functional block diagram illustrating an exemplary functional configuration of the AMF 210.

The AMF 210 includes a communication unit 211, a RAN property acquisition unit 212, an MTU determination unit 213, an MTU application unit 214, and a mapping table 215.

The communication unit 211 sends and receives packets to and from the CU 230. When sending packets to the CU 230, the communication unit 211 adjusts the packet size to be equal to or less than the MTU value corresponding to a target RAN (e.g., CU) to which the outgoing packet is sent based on the MTU value applied by the MTU application unit 214 to transmit packets.

The RAN property acquisition unit 212 extracts, from the incoming packet received by the communication unit 211, property information on the RAN to which the source RAN node of the incoming packet belongs.

Here, the incoming packet may be, for example, a message transmitted from a RAN node when the RAN or UE connects to the core network. The message may be, for example, a setup request message ("NG SETUP REQUEST") transmitted from the CU 230 to the AMF 210, or alternatively, an NGAP message transmitted from the UE to the AMF 210 via the CU 230, which encapsulates a registration request message ("REGISTRATION REQUEST") compliant with the Non-Access Stratum (NAS) protocol.

The property information on the RAN may suffice as long as the property information is information capable of identifying an operator that owns (operates) the RAN concerned.

The property information on the RAN may be, for example, a Public Land Mobile Network (PLMN) number. The PLMN number is an identification number that identifies each of operator networks in which a Mobile Country Code (MCC), which represents a country or a region, is combined with a Mobile Network Code (MNC), which represents an operator.

The MTU determination unit 213 determines the MTU value based on the RAN property information acquired by the RAN property acquisition unit 212. More specifically, the MTU determination unit 213 refers to the mapping table 215 that maps the RAN property information to MTU values, and derives the MTU value corresponding to the RAN property information acquired by the RAN property acquisition unit 212.

The MTU application unit 214 sets the MTU value determined by the MTU determination unit 213 as an MTU value for communicating with the source RAN node of the incoming packet used for determining the MTU value concerned.

The mapping table 215 provides mapping information that maps the property information of the RAN, which is connectable to the core network in the mobile network 100, to the path MTU between a node of the RAN concerned (e.g., CU) and the core network node (i.e., AMF). The MTU determination unit 213 refers to the mapping table 215 to derive the path MTU value corresponding to the RAN property information acquired by the RAN property acquisition unit 212, and determines the derived path MTU value as the above to-be-applied MTU value.

The mapping table 215 may be generated according to the negotiation between the operator that owns the core network (MNO according to the present embodiment) and the operator that owns the RAN (the local 5G operator according to the present embodiment). The addition of records to the mapping table 215 may be made at any time.

FIG. 4 is a schematic diagram illustrating an exemplary structure of the mapping table 215.

The mapping table 215 stores the PLMN numbers and MTU values correspondingly. The mapping table 215 shown in FIG. 4 stores a value of 1500 bytes as the MTU value corresponding to the MNO RAN of which PLMN number is xxxxx. Likewise, the mapping table 215 stores a value of 1450 bytes as the MTU value corresponding to the local 5G RAN of Enterprise A of which PLMN number is yyyyy, and also a value of 1400 bytes as the MTU value corresponding to Enterprise B of which PLMN number is zzzzz.

It should be noted that, although the present embodiment will describe an exemplary case in which the mapping table 215 is stored in an internal memory of the AMF 210, alternatively, the mapping table 215 may be managed outside of the MAF 210. In this case, the AMF 210 may query the external node that manages the mapping table 215 for the MTU values associated with the information on the RAN properties. The external node, upon receiving the query from the AMF 210, refers to the mapping table 215 to derive the MTU value, and sends the result of derivation to the AMF 210. In this case, it makes it possible to share a single mapping table 215 by multiple AMFs 210.

Figure 5:
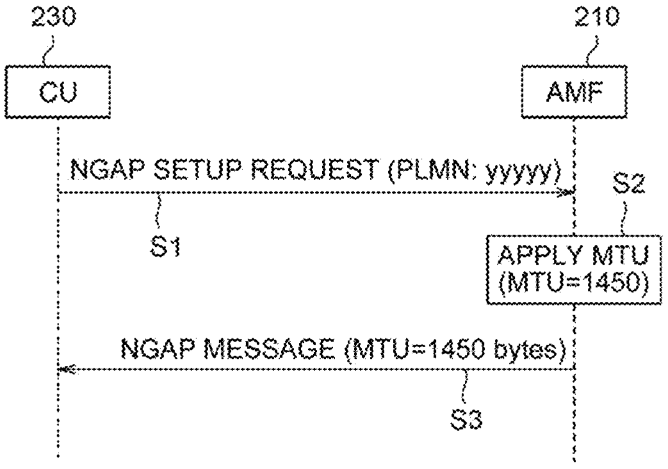
FIG. 5 is a sequence diagram illustrating an exemplary operation for applying an MTU value based on RAN property.

FIG. 5 is a sequence diagram illustrating an exemplary operation for applying the MTU values based on the RAN properties.

When establishing a connection between the RAN (e.g., CU) and the core network node (i.e., AMF), first in step S1, the CU 230 sends an NGAP setup request message to the AMF 210. The setup request message is "NG SETUP REQUEST", which is defined in the 3GPP TS38.413. The setup request message includes the PLNM number of the RAN to which the CU 230 belongs.

Upon receiving the setup request message from the CU 230, the AMF 210 acquires the PLMN number included in the received message. Subsequently, the AMF 210 refers to the mapping table 215 in FIG. 4 and derives the MTU value corresponding to the acquired PLMN number.

For example, when the CU 230 shown in FIG. 5 is a CU belonging to the local 5G RAN of the Enterprise A, then the setup request message sent from the CU 230 includes PLMN=yyyyy. Therefore, the AMF 210 refers to the mapping table 215 and derives the MTU value=1450. In this case, in step S2, the AMF 210 applies the MTU value=1450 to the MTU value for communicating with the CU 230.

Subsequently, in step S3, the AMF 210 sends to the CU 230 a response message ("NG SETUP RESPONSE"), which is in response to the setup request message, and the subsequent NGAP message. At this time, the AMF 210, while recognizing that the maximum size of a packet that can be transmitted without fragmentation of the packet is 1450 bytes, sends the NGAP message to the CU 230.

On the other hand, when the setup request message sent from the CU 230 includes PLMN=zzzzz, then the AMF 210 refers to the mapping table 215 in FIG. 4 and derives the MTU value=1400. Then, the AMF 210 applies the MTU value=1400 to the MTU value for communicating with the CU 230.

In this way, the MTU value=1450 is automatically applied for communicating with the CU 230 belonging to the local 5G RAN with PLMN=yyyyy, while the MTU value=1400 is automatically applied for communicating with another CU 230 belonging to another local 5G RAN with PLMN=zzzzz. In other words, it makes it possible to set an optimal MTU value for each of operators (i.e., each of RANs) to the AMF 210.

Although the example shown in FIG. 5 illustrates only one PLMN number being included in the setup request message, the setup request message may include multiple PLMN numbers. For example, when a base station belongs to both the RAN owned by the Enterprise A and the RAN owned by the Enterprise B, two PLMN numbers are included in the setup request message sent from a CU 230 equipped with the base station concerned In this case, the AMF 210 derives two MTU values corresponding to two PLMN numbers included in the setup request message, respectively. The AMF 210 then selects the smaller value of the two derived MTU values as the MTU value to be applied.

In this way, when the setup request message includes multiple pieces of the property information, the AMF 210 may determine the minimum value of the multiple MTU values determined respectively based on the multiple pieces of the property information as the MTU value to be eventually set to the AMF 210. This allows the AMF 210 to set the MTU value appropriately even when the base station belongs to multiple RANs owned by different operators, respectively.

Figure 6:
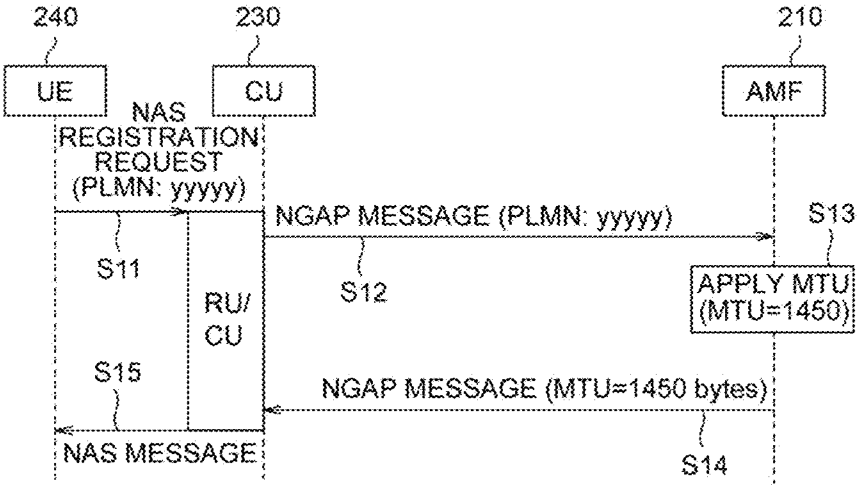
FIG. 6 is a sequence diagram illustrating an exemplary operation for applying the MTU value based on UE property.

FIG. 6 is a sequence diagram illustrating another exemplary operation for applying MTU values based on the RAN properties.

When registering a UE to the core network node (i.e., AMF), first, in step S11, a UE 240 sends a NAS registration request message to the AMF 210. The registration request message is "REGISTRATION REQUEST", which is defined in 3GPP TS24.501. The registration request message includes the PLMN number of the RAN to which the UE 240 belongs.

The NAS registration request message sent from the UE 240 is forwarded to the AMF 210 via the CU 230. In step S12, the CU 230 forwards to the AMF 210 the NGAP message that encapsulates the NAS registration request message sent from the UE 240. The NGAP message includes the PLMN number of the RAN to which the UE 240 belongs.

Upon receiving the NGAP message from the CU 230, the AMF 210 acquires the PLMN number included in the NGAP message. Subsequently, the AMF 210 refers to the mapping table in FIG. 4, and derives the MTU value corresponding to the acquired PLMN number.

For example, when the UE 240 shown in FIG. 6 belongs to the local 5G RAN of the Enterprise A, the registration request message sent from the UE 240 includes PLMN=yyyyy. Therefore, the AMF 210 refers to the mapping table 215 and derives the MTU value=1450.

In this case, in step S13, the AMF 210 applies the MTU value=1450 as the MTU value for communicating with the CU 230.

Subsequently, in step S14, the AMF 210 sends to the CU 230 an NGAP message that encapsulates a NAS message ("REGISTRATION ACCEPT") in response to the registration request message. At this time, AMF 210 sends the NGAP message to the CU 230, while recognizing that the maximum size of the transmittable NGAP message in a state with the NAS message being encapsulated therein is 1450 bytes.

In step S15, the CU 230 sends a response message, which is in response to the registration request message, to the UE 240.

As described above, the AMF 210, which serves as the network management apparatus according to the present embodiment, receives incoming packets sent from a RAN node and determines an MTU value based on the information acquired from the incoming packet. Subsequently, the AMF 210 applies the determined MTU value to an outgoing packet from the core network to the source RAN node of the incoming packet.

In this way, the AMF 210 is able to automatically set the MTU value for each source RAN node of an incoming packet. When determining MTU values, as the AMF 210 determines the MTU value based on the information acquired from the incoming packet, it makes it possible to set an appropriate MTU value for each of RAN nodes.

As a result, it makes it possible to perform the packet transmission processing more efficiently in the packet transmission between the AMF 210 to the RAN nodes without fragmentation of packets. In other words, unlike the case using the conventional path MTU discovery, it makes it possible to eliminate the transmission of the ICMP error messages and the re-transmission of packets, thereby accelerating the packet transmission processing. In addition, it makes it possible to set an appropriate MTU value to each of the RAN nodes so as to enhance data payloads of packets, thereby improving efficiency in the packet transmission.

More specifically, the AMF 210 may extract from the above incoming packet the property information on the RAN to which the RAN node belongs to determine the MTU value based on the property information. The property information may be information capable of identifying each operator that owns the RAN, such as the PLMN.

As a result, in a core network, which aggregates multiple RANs owned by different operators (e.g., local 5G RANs), respectively, the AMF 210 is able to apply an appropriate MTU value for each of RANs (e.g., CUs).

Furthermore, when determining MTU values, the AMF 210 uses the mapping table 215 that maps the property information of a RAN to the path MTU value for the RAN concerned. More specifically, first, the AMF 210 refers to the above mapping table 215 and derives the path MTU value corresponding to the property information extracted from the incoming packet. Subsequently, the AMF 210 determines and applies the derived path MTU value to the MTU value for communicating with the RAN (e.g., CU).

In this way, by using the mapping table 215, it makes it possible to determine the MTU values more easily and appropriately. In addition, it makes it possible to set the MTU value for communicating with each of RANs (e.g., CUs) to the path MTU value to and from each of RANs (e.g., CUs), thereby further improving efficiency in the packet transmission.

Here, the above incoming packet may be the setup request message sent from a RAN node or the registration request message sent from a UE (i.e., communication terminal) via the RAN.

Thus, the AMF 210 is able to determine the MTU values as appropriate based on the setup request message, which is triggered by the CU 230 serving as the RAN node, or the registration request message, which is triggered by the UE 240 via the CU 230. As a result, it makes it possible to apply an appropriate MTU value to a first outgoing packet to be transmitted from the AMF 210 to the above CU 230.

It should be noted that, although the present embodiment has described an exemplary case in which the PLMN is used as the RAN property information and the MTU values are derived based on the PLMN, information used for deriving the MTU values is not limited thereto.

For example, an International Mobile Subscriber Identity (IMSI) of a UE may be used instead for deriving the MTU values. In this case, the AMF 210 prepares and stores a mapping table that maps the IMSI range to the MTU value. Here, the IMSI range is a set of IMSIs constituted with one or more IMSIs, and may be, for example, a set of IMSIs each assigned to each of operators.

The AMF 210 receives the NAS registration request message, which is transmitted from the UE 240 via the CU 230, and acquires the IMSI of the UE 240 included in the registration request message concerned. Subsequently, the AMF 210 identifies the IMSI range that includes the acquired IMSI, and derives the MTU value corresponding to the identified IMSI range from the mapping table.

Here, the above registration request message is “REGISTRATION REQUEST”, which is defined in 3GPP TS24.501. Also, the above IMSI is information defined in 3GPP TS23.502.

Furthermore, the RAN property information used to derive the MTU values may include at least one of the MCC, the MNC, a Tracking Area Code (TAC), a Cell ID, a Single-Network Slice Selection Assistance Information (S-NSSAI), and a RAN node ID. Those kinds of information may be notified from the CU 230 or the UE 240 to the AMF 210 by way of the NGAP message or the NAS message.

Yet furthermore, the RAN property information used to derive the MTU values may include an IP address of the CU 230 or the IP address range/subnet to which the CU 230 belongs. The AMF 210 is able to identify an IP address of the CU 230 from a source IP address of the NGAP message or the NAS message.

In case of using those kinds of information, it makes it possible to determine and apply an appropriate MTU value for each of RANs (e.g., CUs) as well.

The present embodiment has described an exemplary case in which the AMF 210 derives the MTU values based on the information included in the setup request message or the registration request message, which is sent when a RAN or a UE connects to the core network. However, alternatively, the AMF 210 may derive the MTU values based on the packet size of incoming packets received from the CU 230.

When the AMF 210 receives a packet from the CU 230 normally, it can be assumed that the path MTU between the AMF 210 and the CU 230 is equal to or greater than the packet size of the received incoming packet. Therefore, the AMF 210 may acquire the packet size of the received incoming packet and determine the MTU value to be used when transmitting an outgoing packet to the source CU 230 of the incoming packet based on the acquired packet size.

In this case, the AMF 210 is able to automatically set the MTU value that can transmit packets without fragmentation of packets as well. In addition, it makes it possible to eliminate the mapping table 215 used for deriving the MTU values as described above.

Furthermore, the AMF 210 may store the packet size of incoming packets received from the CU 230 as the MTU values, subsequently, compare the stored MTU values with the packet size of a received incoming packet each time an incoming packet is received from the same CU 230, and store the larger value as a new MTU value replacing the previously stored MTU value.

As described above, the AMF 210 may determine the maximum packet size of incoming packets transmitted from the same RAN node as the MTU value and apply the determined MTU value. As a result, it makes it possible to apply the MTU value that is closer to the path MTU.

The AMF 210 may store an MTU value for CUs 230 that share the same IP address range or subnet. In other words, it is possible to group the CUS 230 and apply the same MTU value for the grouped CUs 230 belonging to the same group.

Figure 8:
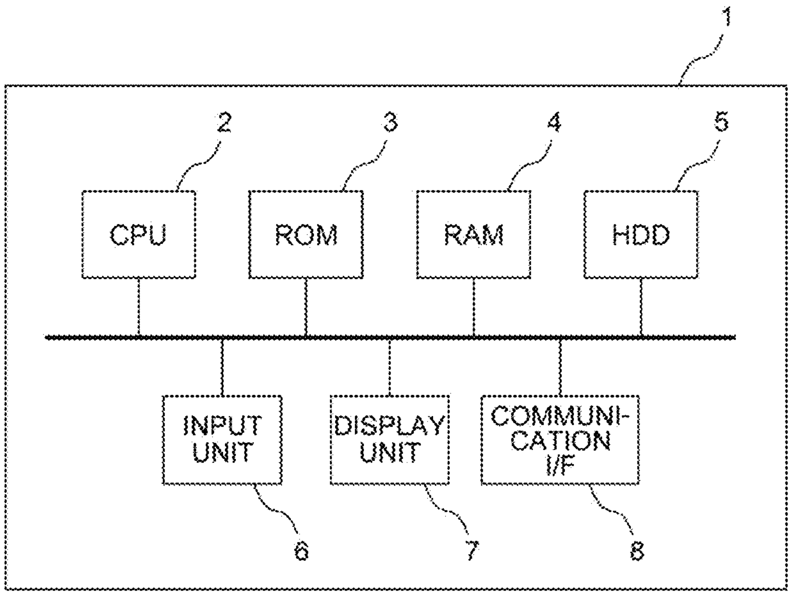
FIG. 8 is a schematic diagram illustrating an exemplary hardware configuration of the network management apparatus.

FIG. 8 is a sequence diagram illustrating an exemplary operation for applying MTU values based on the packet size of incoming packets. Here, an exemplary case will be described in which a first CU (CU1) 231 and a second CU (CU2) 232 belong to the same subnet (subnet 1).

First, in step S21, it is assumed that the first CU 231 sends an NGAP message of 1200 bytes to the AMF 210, and the AMF 210 receives the NGAP message normally.

In this case, in step S22, the AMF 210 applies 1200 bytes, which is the packet size of the received incoming message, as the MTU value for communicating with CUs in the subnet 1 to which the CU 231 belongs. Subsequently, while recognizing that the MTU value is 1200 bytes, the AMF 210 transmits the NGAP message to the first CU 231 (step S23). It should be noted that the subnet to which the first CU 231 belongs may be identified from the IP address of the first CU 231.

Subsequently, in step S24, it is assumed that the second CU 232, which belongs to the same subnet 1 as the first CU 231, sends an NGAP message of 1400 bytes to the AMF 210, and the AMF 210 receives the NGAP message normally.

In this case, the AMF 210 compares the packet size of the incoming packet received from the second CU 232 with the packet size stored as the MTU value for communicating with the CUS of the subnet 1. Here, the packet size of the incoming packet received from the second CU 232 is larger than the stored MTU value. Therefore, in step S25, the AMF 210 updates the MTU value for communicating with the CUS of the subnet 1 to 1400 bytes, which is the packet size of the received incoming packet.

Subsequently, while recognizing that the MTU value is 1400 bytes, the AMF 210 transmits the NGAP massage to the second CU 232 (step S26).

Yet subsequently, in step S27, it is assumed that the AMF 210 receives a NGAP message of 1200 bytes from the first CU 231. In this case, the packet size of the incoming packet received from the first CU 231 is smaller than the packet size stored as the MTU value for communicating with the CUs of the subnet 1. Therefore, the AMF 210 does not update the stored MTU value. In other words, the MTU value for communicating with the CUs in the subnet 1 is kept unchanged as 1400 bytes (step S28).

Subsequently, while recognizing that the MTU value is still 1400 bytes, the AMF 210 transmits the NGAP massage to the first CU 231 (step S29).

As described above, the MTU value determined based on the packet size of the incoming packets received from the CU 230 may be applied to outgoing packets to be transmitted from the AMF 210 to the CUs 230 in the group to which the CU 230 concerned belongs. Here, the nodes belonging to the same group can be determined to be nodes of which IP addresses are within a predetermined IP address range or nodes belonging to the same subnet.

Figure 7:
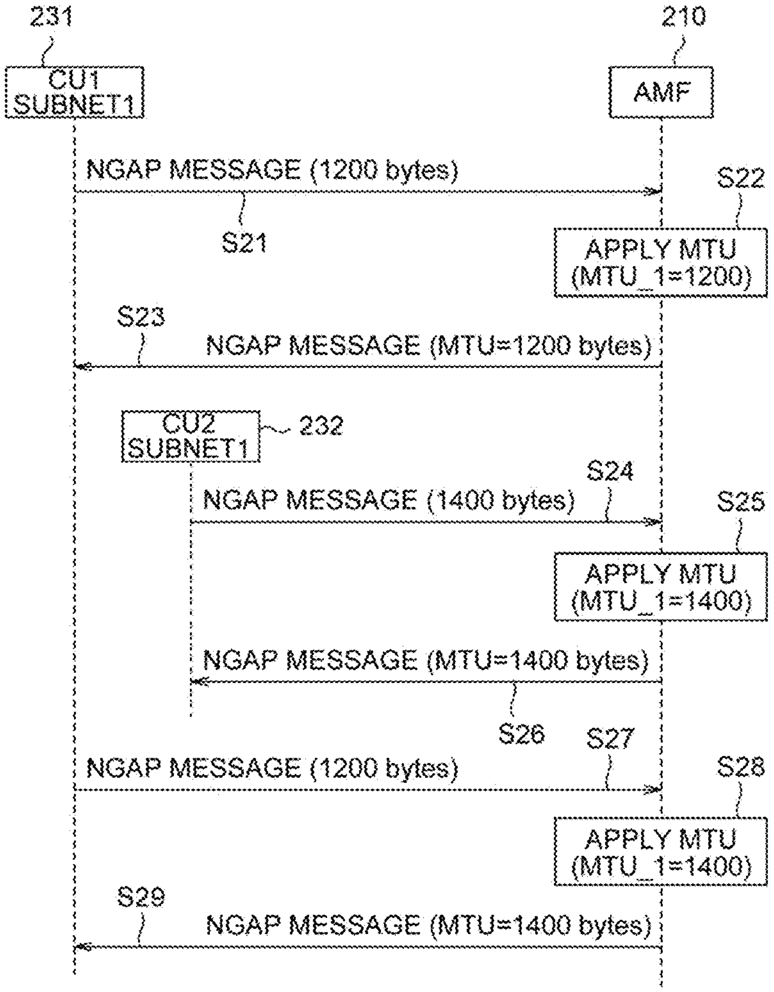
FIG. 7 is a sequence diagram illustrating an exemplary operation for applying the MTU value based on a packet size.

By applying a common MTU value for the grouped CUs 230, as shown in FIG. 7, it makes it possible to recognize that the MTU value is 1400 bytes to send back a massage, even to the first CU 231, which has sent a 1200-byte message only. As a result, it makes it possible to improve efficiency in the packet transmission.

Furthermore, since the CUS 230 are grouped by use of the IP address range or the subnet, it makes it possible to group CUs 230 belonging to the RANs owned by the same operator together to apply the common MTU value thereto. As a result, it makes it possible to appropriately set the MTU values for communicating with respective CUs 230.

As described above, according to the present embodiment, it makes it possible to apply appropriate MTU values in a core network node without changing the standard specifications so as to further improve efficiency in the packet transmission.

It should be noted that, the above embodiment has described an exemplary case in which the mobile network 100 includes a CN owned by an MNO and a RAN owned by a local 5G operator. However, alternatively, the mobile network 100 may include a CN owned by a local 5G operator or other operators and a RAN owned by an MNO or other operators.

Yet furthermore, the above embodiment has described an exemplary case in which the mobile network 100 is the 5G mobile network, however, alternatively, the mobile network 100 may be the 4G mobile network. In other words, the processing and operation of the AMF 210 described above may be applied the processing and operation of a Mobility Management Entity (MME) that constitutes the 4G core network. When applying to the 4G mobile network, it is possible to replace the AMF with the MME, the CU with a Base Band Unit (BBU), the gNB (gNodeB) with an eNB (eNodeB), and the NGAP with an SIAP, respectively.

In addition, the mobile network 100 is not limited to the 5G mobile networks or the 4G mobile networks, and alternatively, may be any mobile networks beyond the 5G, such as $6^{th}$ generation (6G) mobile networks.

The network management apparatus according to the present embodiment may be implemented in any of general-purpose servers that constitute the core network of the mobile network 100. Alternatively, the network management apparatus may be implemented in a dedicated server. The network management apparatus may also be implemented on a single or a plurality of computers.

When the network management apparatus is implemented on a single computer, as shown in FIG. 8, the network management apparatus 1 may include a CPU 2, a ROM 3, a RAM 4, an HDD 5, an input unit (such as a keyboard, a pointing device) 6, a display unit (such as a monitor device) 7, a communication I/F 8, and the like. The network management apparatus 1 may further include an external memory.

The CPU (Central Processing Unit) 2 is constituted with one or more processors and controls entire operations of the network management apparatus 1 in a comprehensive manner. At least a part of functions of respective components shown in FIG. 3 may be implemented by the CPU 2 running programs. It should be noted that those programs may be stored in a non-volatile memory such as the ROM (Read Only Memory) 3, the HDD (Hard Disk Drive) 5, or the like, or alternatively, may be stored in the external memory such as a removable storage medium (not shown).

However, at least a part of the functions of the respective components shown in FIG. 3 may be operated by dedicated hardware. In this case, operation of the dedicated hardware is under the control of the CPU 2 described above.

For functions realized by hardware, for example, by using a prescribed compiler, for example, a dedicated circuit can be generated automatically on an FPGA from the programs to realize the functions of respective functional modules by using a predetermined compiler. Furthermore, a gate array circuit may be formed in the same way as the FPGA and realized as hardware, or alternatively, an ASIC (Application Specific Integrated Circuit) may be used. Embodiments of the present disclosure may include a computer-readable storage medium that stores programs, and the programs may include instructions that, when being executed by the CPU 2 (e.g., at least one of the one or more processors) of the network management apparatus 1, causes the network management apparatus 1 to perform at least one of the methods described above.

Although exemplary embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

Embodiments of Present Disclosure

The present disclosure includes the following embodiments.

[1] A network management apparatus, comprising one or more processors, at least one of the one or more processors being configured to perform: a determination process for determining an MTU (Maximum Transmission Unit) value based on information acquired from an incoming packet transmitted from a node constituting a wireless access network and received in a core network that aggregates a plurality of wireless access networks; and an application process for applying the MTU value to an outgoing packet to be transmitted from the core network to the node.

[2] The network management apparatus according to [1], wherein the determination process extracts property information on the wireless access network to which the node belongs from the incoming packet, and determines the MTU value based on the property information.

[3] The network management apparatus according to [2], wherein the determination process refers to a mapping table that maps the property information on the wireless access network to a path MTU value between a node of the wireless access network and a node of the core network, derives the path MTU value corresponding to the property information extracted from the incoming packet, and determining the derived path MTU value as the MTU value.

[4] The network management apparatus according to [2] or [3], wherein the incoming packet is a setup request message transmitted from the node.

[5] The network management apparatus according to [2] or [3], wherein the incoming packet is a registration request message transmitted from a communication terminal via the wireless access network.

[6] The network management apparatus according to any one of [2] to [5], wherein the property information is information that is capable of identifying an operator owning the wireless access network.

[7] The network management apparatus according to any one of [2] to [6], wherein the property information includes at least one of a PLMN (Public Land Mobile Network), an MCC (Mobile Country Number), an MNC (Mobile Network Code), an International Mobile Subscriber Identity (IMSI), a TAC (Tracking Area Code), a Cell ID, an S-NSSAI (Single-Network Slice Selection Assistance Information), a radio access network node ID, and an IP address.

[8] The network management apparatus according to any one of [2] to [7], wherein, when a plurality of pieces of property information are extracted from the incoming packet, the determination process determines the minimum value of the MTU values determined respectively based on the plurality of pieces of property information as a final MTU value.

[9] The network management apparatus according to any one of [1] to [8], wherein the determination process acquires a packet size of the incoming packet and determines the MTU value based on the packet size.

[10] The network management apparatus according to [9], wherein the determination process determines the maximum value of a packet size of incoming packets transmitted from the same node as the MTU value.

[11] The network management apparatus according to [9] or [10], wherein the application process applies the MTU value to outgoing packets to be transmitted from the core network to nodes in a group to which the node belongs.

[12] The network management apparatus according to [11], wherein the application process determines nodes of which IP addresses are within a predetermined IP address range or nodes belong to the same subnet to be nodes belonging to the same group.

[13] A network management method, comprising: determining an MTU (Maximum Transmission Unit) value based on information acquired from an incoming packet transmitted from a node constituting a wireless access network and received in a core network that aggregates a plurality of wireless access networks; and applying the MTU value to an outgoing packet to be transmitted from the core network to the node.

[14] A network management system, comprising one or more processors, at least one of the one or more processors being configured to perform: a determination process for determining an MTU (Maximum Transmission Unit) value based on information acquired from an incoming packet transmitted from a node constituting a wireless access network and received in a core network that aggregates a plurality of wireless access networks; and an application process for applying the MTU value to an outgoing packet to be transmitted from the core network to the node.

REFERENCE SIGNS LIST

11: Base Station; 12: Edge Data Center; 13: Regional Data Center (RDC); 14: Central Data Center (CDC); 100: Mobile Network; 210: AMF; 211: Communication Unit; 212: RAN Property Acquisition Unit; 213: MTU Determination Unit; 214: MTU Application Unit; 215: Mapping Table; 220: RU; 230: CU, 240: UE

What is claimed is:

1. A network management apparatus, comprising one or more processors, at least one of the one or more processors being configured to perform:

a determination process for determining an MTU (Maximum Transmission Unit) value based on information acquired from an incoming packet, wherein the information includes properties of a path through which the packet is transmitted and the MTU value is optimized to a packet size without exceeding an available path MTU value, transmitted from a node constituting a wireless access network and received in a core network that aggregates a plurality of wireless access networks; and an application process for applying the MTU value to an outgoing packet to be transmitted from the core network to the node ensuring the packet size does not exceed the MTU value thereby preventing fragmentation and ensuring efficient transmission over the path, wherein the determination process sets a first packet size of a received packet transmitted from any node belonging to a group as the MTU value, and when a second packet size of a received packet transmitted from any node belonging to the group is larger than the first packet size, updates the second packet size as the MTU value, wherein the determination process extracts property information on the wireless access network to which the node belongs from the incoming packet, and determines the MTU value based on the property information, and wherein the determination process refers to a mapping table that maps the property information on the wireless access network to a path MTU value between a node of the wireless access network and a node of the core network, derives the path MTU value corresponding to the property information extracted from the incoming packet, and determining the derived path MTU value as the MTU value.

2. The network management apparatus according to claim 1, wherein the incoming packet is a setup request message transmitted from the node.

3. The network management apparatus according to claim 1, wherein the incoming packet is a registration request message transmitted from a communication terminal via the wireless access network.

4. The network management apparatus according to claim 1, wherein the property information is information that is capable of identifying an operator owning the wireless access network.

5. The network management apparatus according to claim 1, wherein the property information includes at least one of a PLMN (Public Land Mobile Network), an MCC (Mobile Country Number), an MNC (Mobile Network Code), an International Mobile Subscriber Identity (IMSI), a TAC (Tracking Area Code), a Cell ID, an S-NSSAI (Single-Network Slice Selection Assistance Information), a radio access network node ID, and an IP address.

6. The network management apparatus according to claim 1, wherein, when a plurality of pieces of property information are extracted from the incoming packet, the determination process determines the minimum value of the MTU values determined respectively based on the plurality of pieces of property information as a final MTU value.

7. The network management apparatus according to claim 1, wherein the determination process determines the maximum value of a packet size of incoming packets transmitted from the same node as the MTU value.

8. The network management apparatus according to claim 1, wherein the application process applies the MTU value to outgoing packets to be transmitted from the core network to nodes in a group to which the node belongs.

9. The network management apparatus according to claim 8, wherein the application process determines nodes of which IP addresses are within a predetermined IP address range or nodes belong to the same subnet to be nodes belonging to the same group.

10. A network management method, comprising:

determining an MTU (Maximum Transmission Unit) value based on information acquired from an incoming packet, wherein the information includes properties of a path through which the packet is transmitted and the MTU value is optimized to a packet size without exceeding an available path MTU value, transmitted from a node constituting a wireless access network and received in a core network that aggregates a plurality of wireless access networks; and applying the MTU value to an outgoing packet to be transmitted from the core network to the node ensuring the packet size does not exceed the MTU value thereby preventing fragmentation and ensuring efficient transmission over the path, wherein the determination process sets a first packet size of a received packet transmitted from any node belonging to a group as the MTU value, and when a second packet size of a received packet transmitted from any node belonging to the group is larger than the first packet size, updates the second packet size as the MTU value, wherein the determination process extracts property information on the wireless access network to which the node belongs from the incoming packet, and determines the MTU value based on the property information, and wherein the determination process refers to a mapping table that maps the property information on the wireless access network to a path MTU value between a node of the wireless access network and a node of the core network, derives the path MTU value corresponding to the property information extracted from the incoming packet, and determining the derived path MTU value as the MTU value.

11. A network management system, comprising one or more processors, at least one of the one or more processors being configured to perform:

a determination process for determining an MTU (Maximum Transmission Unit) value based on information acquired from an incoming packet, wherein the information includes properties of a path through which the packet is transmitted and the MTU value is optimized to a packet size without exceeding an available path MTU value, transmitted from a node constituting a wireless access network and received in a core network that aggregates a plurality of wireless access networks; and an application process for applying the MTU value to an outgoing packet to be transmitted from the core network to the node ensuring the packet size does not exceed the MTU value thereby preventing fragmentation and ensuring efficient transmission over the path, wherein the determination process sets a first packet size of a received packet transmitted from any node belonging to a group as the MTU value, and when a second packet size of a received packet transmitted from any node belonging to the group is larger than the first packet size, updates the second packet size as the MTU value, wherein the determination process extracts property information on the wireless access network to which the node belongs from the incoming packet, and determines the MTU value based on the property information, and wherein the determination process refers to a mapping table that maps the property information on the wireless access network to a path MTU value between a node of the wireless access network and a node of the core network, derives the path MTU value corresponding to the property information extracted from the incoming packet, and determining the derived path MTU value as the MTU value.

* * * * *